No. 609,666. Patented Aug. 23, 1898.
J. S. EARHART & C. MILLER.
PLANTER.
(Application filed Oct. 21, 1897.)
(No Model.)

WITNESSES:
Edward Thorpe
JCdAcker

INVENTORS
J. S. Earhart
C. Miller
BY
ATTORNEYS.

UNITED STATES PATENT OFFICE.

JOHN S. EARHART AND CHARLES MILLER, OF MILLERSVILLE, ILLINOIS.

PLANTER.

SPECIFICATION forming part of Letters Patent No. 609,666, dated August 23, 1898.

Application filed October 21, 1897. Serial No. 655,955. (No model.)

*To all whom it may concern:*

Be it known that we, JOHN S. EARHART and CHARLES MILLER, of Millersville, in the county of Christian and State of Illinois, have invented a new and useful Improvement in Planters, of which the following is a full, clear, and exact description.

The object of our invention is to provide an improvement upon the construction of planters for which Letters Patent were granted to us July 27, 1897, No. 587,190. The improvements relate particularly to the connection between the seed-drop mechanism of the seedboxes, three of which are employed, and to the means for adjusting the central seedbox so as to cause the seed to be planted more or less deeply.

It is also the object of the invention to so construct the improvements above enumerated that they will add to the effectiveness of the implement and simplify the means employed for manipulating the several parts of the implement and effect a reduction in the cost of construction.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1:
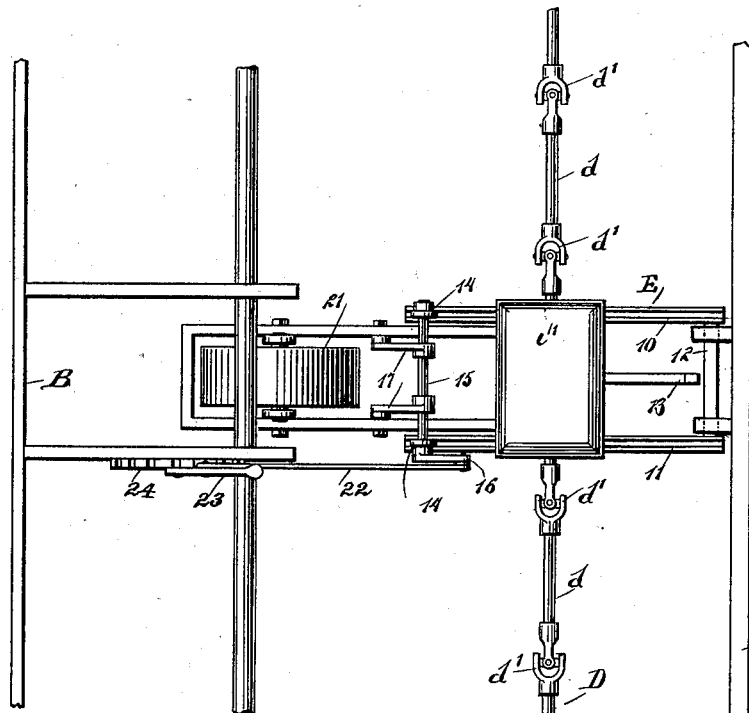
Figure 2:
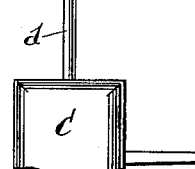
Figure 2:
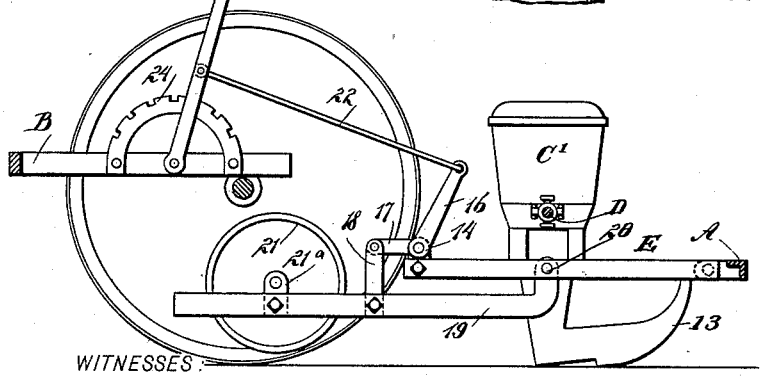

Figure 1 is a plan view of a portion of the frame of a planter, illustrating the central seedbox and the improvements used in connection therewith; and Fig. 2 is a vertical section through the frame shown in Fig. 1 and through the shaft connecting the seedbox, illustrating in side elevation the device for regulating the depth of planting for the said central seedbox.

A represents the forward portion of a planter-frame; B, the rear portion thereof; C, one of the end seedboxes; C', the central seedbox, and D the improved shaft, used to connect the dropping mechanism of the several boxes.

In the patent above referred to belts and gearing are independently employed for the dropping mechanism of each of the seedboxes, whereas under the present construction a continuous shaft D connects the dropping mechanism of all of the boxes, the said shaft D being constructed in sections $d$, connected by gimbal-joints $d'$. Thus it will be observed that while a continuous shaft is employed the end seedboxes may readily accommodate themselves to the position of the central seedbox, and vice versa, and that the implement may be carried over uneven ground without interfering with the operation of the dropping-shaft.

The central seedbox C' is supported upon a frame E, which preferably consists of side pieces 10 and 11, consisting, preferably, of channel-bars or bars U-shaped in cross-section connected at the front by a cross-bar 12. The usual runner 13 is provided for the central seedbox, and from the rear end portions of the side pieces of the frame E standards 14 are upwardly projected. A shaft 15 is journaled in the standards 14, the shaft being provided at one of its ends with a crank-arm 16 and likewise with crank-arms 17, one at each side of the center. The crank-arms 17, near the central portion of the shaft 15, are pivotally connected with uprights 18, which are attached to the frame 19, the forward ends of the said frame being pivotally attached to about the central portion of the supporting-frame E of the central seedbox, the pivot-pin being designated as 20, as shown best in Fig. 2. Ears 21ª are projected upward from the sides of the frame 19, which extends rearwardly beyond the frame E, and in the said ears 21ª the trunnions of a roller or a wheel 21 are journaled. A link 22 is attached to the end crank-arm 16 of the shaft 15, the said link being also attached to a lever 23, having the usual thumb-latch for engagement with a rack 24, the rack and lever being carried by the rear portion of the main frame of the implement.

It will be observed that by moving the lever 23 forward or rearward the frame 19 will be raised or lowered and the wheel 21 will be carried toward or away from the ground, thus regulating the depth that the central runner 13 shall enter the ground.

Having thus described our invention, we claim as new and desire to secure by Letters Patent—

1. In a planter, a main frame, seedboxes carried by said frame, an auxiliary frame, a seedbox carried by said auxiliary frame, a frame pivotally attached to the said auxiliary frame and provided with means for engaging the ground, a device for raising or lowering the said pivoted frame, and a continuous shaft passing through the seedboxes and connecting the dropping mechanism of all the seedboxes, the said shaft being constructed in jointed sections, substantially as set forth.

2. In a planter, the combination with a main frame, a seedbox, a supporting-frame for the seedbox, and a runner provided for said seedbox, of a frame having side pieces connected at their rear by a cross-piece, the said side pieces having upwardly-extending forward ends pivotally attached to the supporting-frame of the seedbox, a wheel journaled in the rear portion of the pivoted frame and a lift-lever connected with the pivoted wheel-carrying frame, for the purpose set forth.

3. In a planter, a main frame, seedboxes carried by said frame, an intermediate seedbox, a supporting-frame for said intermediate seedbox, a frame pivotally attached to the supporting-frame of the said intermediate seedbox, a wheel carried by the said pivoted frame, a lift-lever connected with the wheel-carrying frame, and a continuous jointed shaft connecting the seed-dropping mechanism of the several boxes, as and for the purpose set forth.

4. In a planter, the combination with a frame, a seedbox, a supporting-frame for the seedbox, and a runner provided for said box, of a frame pivotally attached at its forward portion to the supporting-frame of the seedbox at or near the central portion thereof, and extending forwardly therefrom, a wheel carried by the rear portion of the pivoted frame, a shaft carried at the rear portion of the said supporting-frame of the seedbox, a connection between said shaft and the said pivoted frame, and a lever connected with the said shaft, for the purpose set forth.

5. In a planter, the combination with a frame, a seedbox carried by the frame, and a runner connected with the seedbox, the sides of the said frame at the rear being provided with upwardly-projecting standards, of a shaft journaled in the said standards, the said shaft being provided with a crank-arm at one of its ends and crank-arms one at each side of the center, a second frame pivoted at its forward end to the seedbox-supporting frame, at or near the central portion thereof and extending rearwardly therefrom, a wheel journaled in the said rearwardly-extending frame near the rear end thereof, the intermediate crank-arms of the said shaft being pivotally connected with uprights attached to the said rearwardly-extending frame, a lever, a support for the same, and a link connecting the said lever with the crank-arm at the end of the said shaft, as specified.

JOHN S. EARHART.
CHARLES MILLER.

Witnesses:
C. M. SEATON,
S. J. MILLER.